United States Patent [19]
Mutzhas et al.

[11] Patent Number: 5,235,358
[45] Date of Patent: Aug. 10, 1993

[54] LIGHT FILTER FOR IMPROVING VISION

[76] Inventors: Maximillian F. Mutzhas; Seymour Zigman, both of Fleischmannstrasse 7, D-8000 Munich 71, Fed. Rep. of Germany

[21] Appl. No.: 768,449
[22] PCT Filed: Nov. 7, 1989
[86] PCT No.: PCT/EP89/01329
§ 371 Date: Oct. 21, 1991
§ 102(e) Date: Oct. 21, 1991
[87] PCT Pub. No.: WO90/05321
PCT Pub. Date: May 17, 1990

[30] Foreign Application Priority Data
Nov. 8, 1988 [DE] Fed. Rep. of Germany ....... 3837884

[51] Int. Cl.$^5$ .................................... G02C 7/10
[52] U.S. Cl. .................................... 351/163
[58] Field of Search ............... 351/163, 164, 165

[56] References Cited

U.S. PATENT DOCUMENTS 4,470,673 9/1984 Gilson et al. .................... 351/163
4,783,142 11/1988 Mutzhas .......................... 351/163

FOREIGN PATENT DOCUMENTS 0311290 4/1989 European Pat. Off. .
3532780 3/1987 Fed. Rep. of Germany .
WO88/02871 4/1988 World Int. Prop. O. .

OTHER PUBLICATIONS

"Purchasing Information, Melles Griot B.V. 1975 for Colored Glass Filters With Curves".

*Primary Examiner*—Scott J. Sugarman
*Attorney, Agent, or Firm*—Beveridge, DeGrandi, Weilacher & Young

[57] ABSTRACT

A light filter for filtering light for a human eye with the filter being formed of a plastic material in combination with the filtering material. The filtering material is added so as to provide the filter with spectral transmittance characteristics which include a cut-off location ($\lambda H$) of 450 nm to 550 nm, a steepness (S) for the transmittance curve at the cut-off location of at least $1\%.nm^{-1}$, a means transmittance ($\tau_2$) in a spectral range from 380 to 450 nm of at most 20%, and a means transmittance ($\tau_3$) in a spectral range from 450 to 550 nm of at least 40%. The filtering material preferably includes an organic dye dissolved in the plastic or an organic pigment finely distributed in the plastic material. In addition, the mean transmittance ($\tau_2$) in the 380 to 450 nm spectral range is at most 10% and the means transmittance ($\tau_3$) in the 450 to 550 nm spectral range is at least 60%. Further, the light filter has a means transmittance of ($\tau_4$) in a 550 to 780 nm spectral range of at least 65% and a means transmittance ($\tau_1$) in a 250 to 380 nm spectral range of at most 10%.

20 Claims, 1 Drawing Sheet

LIGHT FILTER FOR IMPROVING VISION

TECHNICAL FIELD

The present invention relates to a light filter, which is either located in the region of the eye or that filters the light before it reaches the visual field.

INDUSTRIAL APPLICABILITY

Among many people, particularly older persons, the cornea and lens of the eyes are subject to disturbances with reference to the light transmission. These disturbances, which are frequently referred to as cataracts, result in the scattering of light incident on the eye and in inherent fluorescence. These effects appearing in the lens cause dazzling and swamping phenomena which lead to a reduction of visual acuity and the contrast vision. The short-wave spectral range of the light is scattered considerably more than the longer-wave range, furthermore it causes the fluorescence in the lens. In addition to this, the short-wave spectral portion also impairs the vision of people with retina-related weakness of vision.

PRIOR ART

Hitherto, this pathological change in the eye, also referred to as grey cataracts, has been treated surgically. In this operation, the lens is removed surgically and the missing lens is, in an older method, compensated for by cataract lenses. The glasses of these cataract lenses comprise a high diopter rating, are thick, heavy and disfigure the appearance of the wearer considerably due to the great distortions.

A modern method is to implant a lens made of plastic to replace the removed natural lens. Here, too, as with the cataract lenses, the eye can no longer accommodate, that is to say adjust itself sharp to the different distances of the viewed object. In addition to the considerable physiological and psychological discomfort, the lack of accommodation impairs strongly also the viewing ease as compared with people with normal eyesight.

DESCRIPTION OF THE INVENTION

It is the object of the present invention to provide a light filter which postpones the otherwise necessary eye operations or even renders them superfluous.

The invention makes it possible for people suffering from weakness of vision to see better by improving the visual acuity and the contrast vision, respectively. There are a lot of people who are almost blind because of different eye infirmities and visual error, and whose weakness of vision is based on the loss of the visual acuity and the contrast vision, respectively.

The invention provides essential advantages for people with healthy eyes too. So the psychological essential effect of continuous sun shining shall be given and the colour contrast and the stereoscopic vision shall be improved. The vision conditions shall be improved in fog, rain or in a snow-storm. These positive effects in particular are advantageous for people driving motor vehicles, guiding boats or flying aircraft and for participation in and view of fast sports.

On one hand it is decisive, that the spectral portion of the radiation with a wave length smaller than 450 nm (ultraviolet, violet, blue) is filtered out totally or at least partly, before the radiation enters the eye. On the other hand a greater radiation portion, the wave length of which is above 450 nm, must enter the eye and reach the retina to deliver enough information for good viewing ease.

The practical solution of this problem is achieved basically by two different methods:
1. The radiation is filtered directly before it enters the eye.
2. The radiation is filtered before entering the visual field.

In the first case, the filtering takes place in a contact lens, a pair of spectacles or in a clip-on lens attached to the spectacles.

In the second case, the daylight entering the room is filtered in the area of the entrance place (e.g. window, skylight, door glazing). In the case of artificial room lighting, the light is filtered in the area of the lamp. In the case of TV sets, monitors, etc. the filtering of the emitted light can take place in front of or on the screen. Filtering can be effected in this cases among others by placing a light filter in front of the light source in the form of a foil, pane or housing, or in the form of lacquer or interference coatings.

This problem is solved according to the invention in such a way, that by means of the light filter the visual acuity and the contrast vision will be improved through its mean transmittance which, in the 380 to 450 nm ($\tau_2$) spectral range, is at most 20%, preferably at most 10% and still more preferably at most 1% and, in the 450 to 550 nm ($\tau_3$) spectral range, is at least 40%, preferably at least 60% and still more preferably at least 70%.

Detailed ophthalmological investigations have shown that a marked improvement of eye sight was detected among patients using the light filter, particularly in the low-contrast range. This improvement was significant and reproducible with regard to visual acuity and contrast vision. In addition to this, the psychologically positive impression of permanent sunshine was achieved by filtering out the blue and blue-green spectral portions. This latter effect is to be attributed to the yellow color of the light filter.

On the other hand, the extensive investigations on which the invention is based showed that a higher mean transmittance is necessary in the 550 to 780 nm spectral range in order to provide the retina with sufficient information for color vision. This applies above all for inside rooms and at night.

According to the invention, the light filter's mean transmittance in the 550 to 780 nm ($\tau_4$) spectral range is therefore at least 45%, preferably at least 65% and still more preferably at least 85%.

Further investigations showed that the spectral portion of 250 to 380 nm which is in the ultraviolet range should be kept away from the eye in order to reduce the risk of damage in the conjunctiva, cornea and lens.

According to the invention, the light filter's mean transmittance in the 250 to 380 nm ($\tau_1$) spectral range is thus at most 10%, preferably at most 1% and still more preferably at most 0.1%.

A further result of the investigations was that, with regard to viewing ease, the light transmittance values of the light filter are linked to those of the mean transmittance in the 450 to 550 nm spectral range.

Hence it follows, according to the invention, that the mean transmittance in the 450 to 550 nm ($\tau_3$) range is at least 0.6 times as much, preferably at least 0.7 times as much and still more preferably at least 0.8 as much as the light transmittance ($\tau_{vis}$).

The aforementioned investigations showed furthermore that the cut-off location ($\lambda_H$) of the light filter must be within a relatively narrow spectral range of about 450 to 550 nm in order to achieve optimum effects. The cut-off location is that point on the spectral transmittance curve rising to the long-wave range at which half of the maximum transmittance in the 380 to 780 nm range is registered.

Hence it follows according to the invention that the cut-off location ($\lambda_H$) is at least 450 nm and at most 550 nm.

The investigations showed that, in addition to the cut-off location ($\lambda_H$), the steepness of the transmittance curve (S) plays also a substantial role. A too plateaued rise of the transmittance curve would considerably impair the desired effect.

Hence it follows according to the invention that the steepness of the transmittance curve (S) at the wavelength of the cut-off location is at least $1\% \cdot nm^{-1}$, preferably at least $2\% \cdot nm^{-1}$ and still more preferably at least $3\% \cdot nm^{-1}$.

The spectral transmittance properties ($\tau(\lambda)$) of the light filter are determined by the spectral properties of the base material and filter material distributed therein.

For practical use in the region of the eye, the light filter can be designed as a contact lens or as a spectacle or clip-on lens. If it is designed as a contact lens made of plastic, then the filter material is incorporated in the base material and homogenously distributed therein. The same applies to spectacle or clip-on lenses which are made either of plastic or of glass.

It is thus a further feature of the invention that the filter material is incorporated in the base material of the contact lens or spectacle or clip-on lens during production to be homogeneously distributed there after production. If glass is used for the spectacle or clip-on lenses, yellow filter glass can be utilized.

Thus, according to an embodiment of the invention yellow colored glass is utilized, if glass as spectacle or clip-on lens is used.

In some cases, it is possible that the light filter has not a constant thickness across its entire surface. This will above all be the case at contact lenses and spectacle lenses used for correction. If the filter material is homogeneously distributed in the base material, then the spectral transmittance is not identical across the entire surface due to deviations in the thickness. In order to offset this disadvantage, a layer with constant thickness and homogeneous surface concentration with respect to the filter material is embedded in the interior or applied externally. Embedding this filter layer in the interior can be achieved in different ways. For instance, the filter layer can be laminated with the cover layers. It is also possible to build up the cover layers and the filter layer in a casting process or by multi-layer extrusion. Further the filter layer can be applied as a cover coating in the form of lacquer and the opposite one can be applied as a second cover coating.

A further embodiment of the invention thus arises, if the light filter is embedded in the interior or applied externally as a layer with constant thickness during the production of the contact lens and of the spectacle lens respectively.

The practical tests revealed that an elegant method is to ink the contact lens or spectacle lens subsequently with the color filter. This can be done with a lacquer in which the filter material is homogeneously distributed and which adheres well to the material of the contact lens resp. of the spectacle lens. For instance, lacquers on the base of polyvinyl chloride, acryl, epoxy, polyurethane, polyester and fluorine polymer have proved to be favorable.

The light filter may be a lacquer layer for the purpose according to the invention.

In practice, it has proved advantageous for the lacquer layer to be largely scratch-proof. Siloxane lacquer either containing the filter material or applied as an additional cover coating without specific filtering properties is highly suitable for this purpose.

Within the scope of the invention, the largely scratch-proof lacquer layer may be applied as siloxane lacquer in which the filter material is homogeneously distributed or as an additional cover coating without specific filtering properties.

The large degree of scratch-proofness can also be achieved by evaporating transparent layers (e.g. quartz, glass, metal oxides, etc.). In this way, the light filter can also be evaporated using suitable materials. A further possibility for applying the light filter is by applying the interference layers in baths.

If the light filter is manufactured in the form of a contact lens in which the filter material reaches up to the surface, the filter material may be dissolved by lachrymal fluid, and may irritate or even damage the eye. The investigations showed that, in this case, it is expedient to apply a cover coating which prevents the filter material from being dissolved out.

In this embodiment of the invention, in the case of a contact lens, an additional layer which protects the eye is applied externally.

In those cases where the light filter is e.g. not supposed to be continuously worn in connection with a pair of spectacles, the light filter may also be designed as a clip-on lens. This is a slip-on attachment which even can have a turn-up design.

Thus the invention comprises, as a further variant, a light filter which is designed as a rigid, removable and-/or turn-up attachment for spectacles.

In order to avoid breakage of the spectacles or clip-on lens, it may be made of a material with increased impact strength. Suitable for this are, for instance, polycarbonate, cellulose-ester and acryl glass with increased impact resistance, which all have the advantage of being light-weight, and highly transparent duroplasts such as CR 39, which is named as being representative for the whole group of materials.

According to a further embodiment of the present invention the material from which the spectacles or clip-on lenses are made has an impact strength of at least $15 \, kJ \cdot m^{-2}$, preferably at least $40 \, kJ \cdot m^{-2}$, still more preferably at least $65 \, kJ \cdot m^{-2}$.

If the light filter is made of glass, it is expedient to modify the optical base glass (silicate glass) by adding metals or metal compounds and to admix cadmium sulfide which is distributed colloidally by means of the tarnishing process.

If the light filter is made of plastic, then soluble organic dyes and organic or inorganic pigments of the smallest particle sizes are suitable as filter materials.

The following soluble organic dyes have proved to be suitable: styryl, quinophthalone, naphthazine, pyrazolone, mono- and diazo derivatives.

The following are suitable pigments: quinacridones, isoindolinones with or without cobalt complexes resp. copper complexes, aryl amides, diarylides and lead/-(sulfur)/chromium compounds.

If the soluble dyes or pigments do not sufficiently filter out the ultraviolet spectral portion, then it is recommended to use benzotriazoles or benzophenones as additional filter materials.

BRIEF DESCRIPTION OF THE DRAWINGS

Some embodiments of the invention are illustrated in the drawings.

THE BEST WAY TO CARRY OUT THE INVENTION

Figure 1:
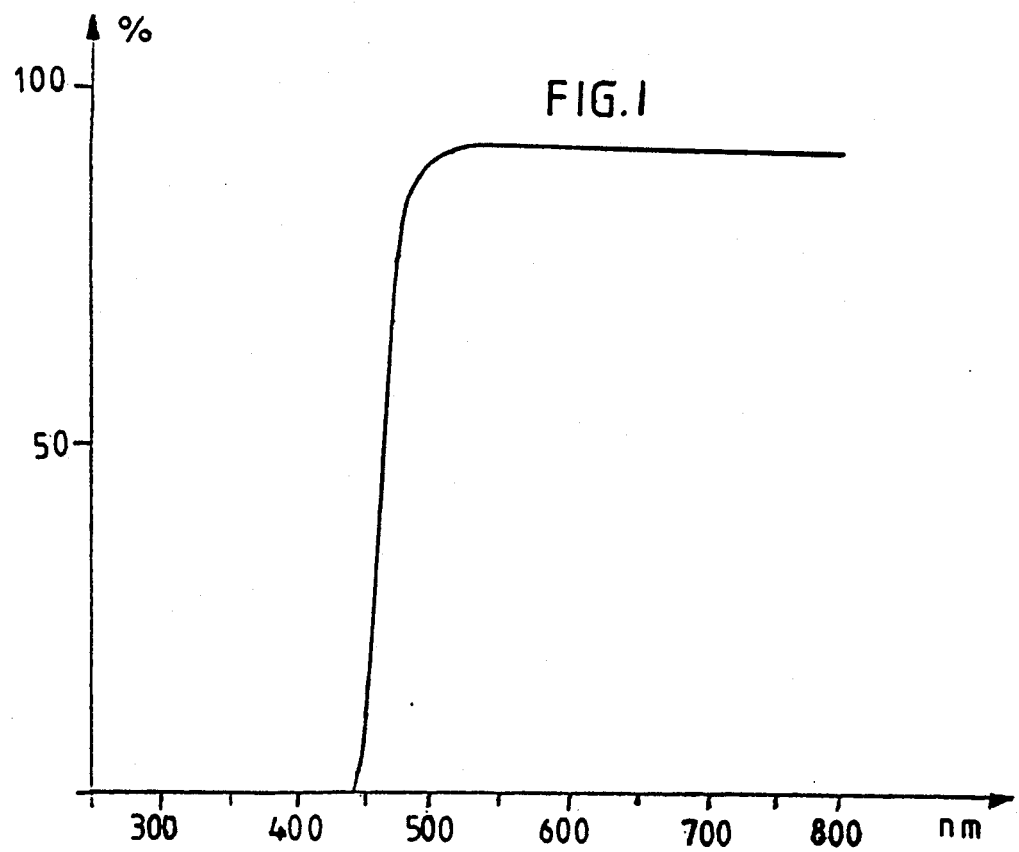
FIG. 1 shows the spectral transmittance degree of a light filter according to the invention made of glass.

The spectral transmittance degree ($\tau(\lambda)$) represented in FIG. 1 shows the permeability of the light filter as a function of the wavelength. The light filter is a 2 mm thick yellow colored glass pane whose composition and properties are described in example 1.

Figure 2:
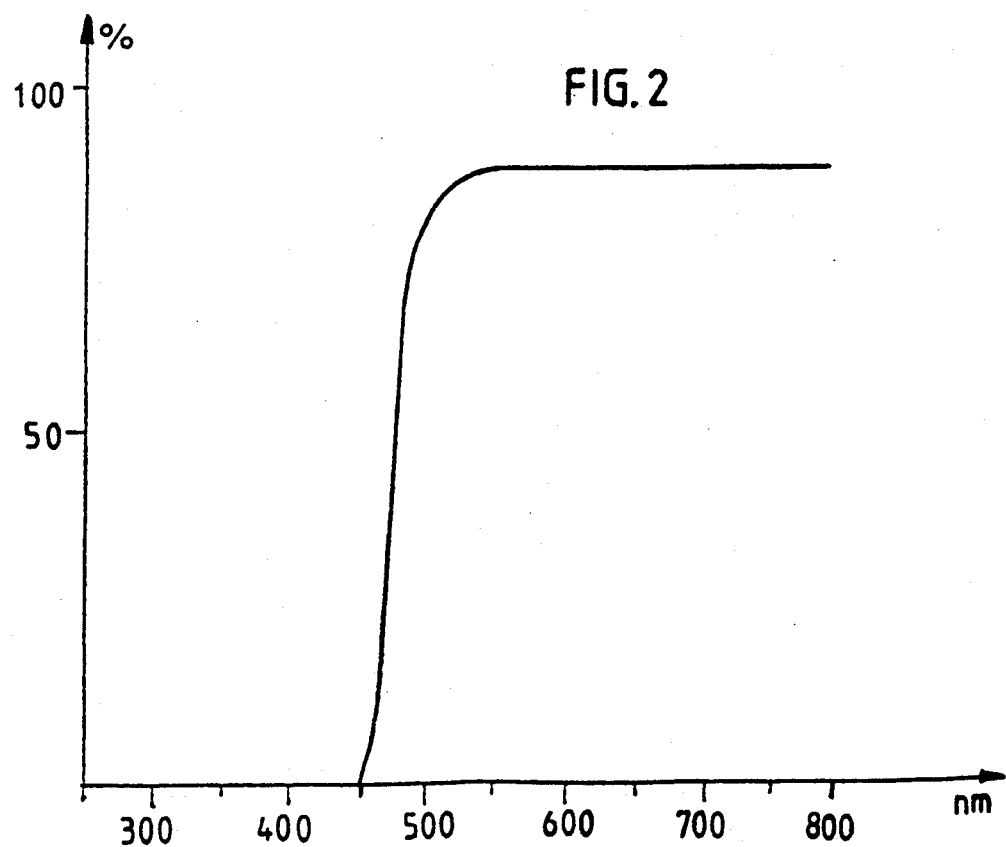
FIG. 2 shows the spectral transmittance degree of a light filter according to the invention made of plastic.

The spectral transmittance degree ($\tau(\lambda)$) shown in FIG. 2 applies to 2 mm thick light filter made of polycarbonate whose composition and properties are described in example 2.

EXAMPLE 1

The light filter is a yellow colored glass pane with a thickness of 2 mm. It consists of a silicate basis glass melt into which 10% filter material as admixture SEEMORE YELLOW G 01 (Mutzhas Produktions-Gesellschaft mbH, Munich) is added. The curve ($\tau(\lambda)$) is shown in FIG. 1. The following individual values are obtained:

$\tau_1 < 1\%$
$\tau_2 < 1\%$
$\tau_3 = 76\%$
$\tau_4 = 91\%$
$\tau_{vis} = 88\%$
$\tau_3 1 \tau_{vis} = 0.86$
$\lambda_H = 465$ nm
$S = 3.1\% \cdot nm^{-1}$

EXAMPLE 2

The light filter is a pane made of 2 mm thick polycarbonate. Prior to the injection molding, 5% filter material were added to the PC granules in the form of a SEEMORE YELLOW PO 1 master batch (Mutzhas Produktions-Gesellschaft mbH, Munich). The curve ($\tau(\lambda)$) is shown in FIG. 2. The following individual values were obtained:

$\tau_1 < 1\%$
$\tau_2 < 1\%$
$\tau_3 = 63\%$
$\tau_4 = 89\%$
$\tau_{vis} = 89\%$
$\tau_3 \tau_{vis} = 0.74$
$\lambda_H = 475$ nm
$S = 2.8\% \cdot nm^{-1}$ The impact strength of this light filter exceeds 65 kJ $\cdot$ m$^{-2}$.

Not only spectacles or clip-on lenses can be produced in this way, but also covers for inside room lights. In the latter case spectacles or contact lenses with light filters need not be worn in this room when the artificial lighting is on.

EXAMPLE 3

Two colorless acrylic glass panes (PMMA) are held in a frame at mutual distance of 1 mm. Methyl methacrylate containing 9% filter material SEEMORE YELLOW PO 2 (mutzhas Produktions-Gesellschaft mbH, Munich) is poured into the interspaces and subsequently polymerized. Spectacle lenses for corrective spectacles can then be made from this sandwich. The following individual values are obtained:

$\tau_1 < 0.1\%$
$\tau_2 < 0.2\%$
$\tau_3 = 70\%$
$\tau_4 = 91\%$
$\tau_{vis} = 86\%$
$\tau_3 \tau_{vis} = 0.81$
$\lambda_H = 470$ nm
$S = 2.9\% \cdot nm^{-1}$ Soft and hard contact lenses can be manufactured in similar way using the known polymers, whereby the admixture materials SEEMORE YELLOW PO3, PO4, PO5 or PO6 (Mutzhas Produktions-Gesellschaft mdH, Munich) are used.

EXAMPLE 4

Spectacle lenses for corrective spectacles are dipped into a lacquer in which 14% filter material SEEMORE YELLOW PO7 is dissolved. The following values are obtained after drying:

$\tau_1 < 0.1\%$
$\tau_2 < 1\%$
$\tau_3 = 65\%$
$\tau_4 = 85\%$
$\tau_{vis} = 88\%$
$\tau_3 1 \tau_{vis} = 0.76$
$\lambda_H = 475$ nm
$S = 2.7\% \cdot nm^{-1}$

EXAMPLE 5

12% filter material SEEMORE YELLOW PO8 (Mutzhas Produktions-Gesellschaft mbH, Munich) are worked into the base material of the contact lens. After completion, the contact lens is coated with a protective layer of base material by injection molding or dipping. The following values are obtained:

$\tau_1 < 1\%$
$\tau_2 < 2\%$
$\tau_3 = 64\%$
$\tau_4 = 89\%$
$\tau_{vis} = 85\%$
$\tau_3 1 \tau_{vis} = 0.75$
$\lambda_H = 475$ nm
$S = 2.7\% \cdot nm^{-1}$

EXAMPLE 6

6% filter material SEEMORE YELLOW PO9 (Mutzhas Produktions-Gesellschaft mbH, Munich) are worked into the base material of a PVC film. The following values are obtained:

$\tau_1 < 1\%$
$\tau_2 < 1\%$
$\tau_3 = 59\%$
$\tau_{vis} = 85\%$
$\tau_3 1 \tau_{vis} = 0.73$
$\lambda_H = 480$ nm
$S = 2.7\% \cdot nm^{-1}$ This film filters the daylight coming in through the window panes, so that there is no need to wear a pair of spectacles or contact lenses with light filters in this room in daylight.

EXAMPLE 7

A 3 mm thick extruded acryl glass pane contains 3% SEEMORE YELLOW PO10 (Mutzhas Produktions-Gesellschaft mbH, Munich) filter material. The following individual values are obtained:
$\tau_1 < 0.1\%$
$\tau_2 < 0.2\%$
$\tau_3 = 70\%$
$\tau_4 = 91\%$
$\tau_{vis} = 86\%$
$\tau_3 1 \tau_{vis} = 0.81$
$\lambda_H = 470$ nm
$S = 2.9\% \cdot nm^{-1}$ If the picture tube of a color TV set is covered with this light filter, than it is possible to watch TV without having to wear spectacles or contact lenses with light filters.

EXAMPLE 8

The light filter are sun glasses, the panes of which consisting of polycarbonate (see example 2). Additionally 3% of a neutral filter material as masterbatch SEEMORE GRAY P01 (Mutzhas Produktions-Gesellschaft mbH, Munich) is mixed into the PC granulate. The following individual values are obtained:
$\tau_1 < 0,02\%$
$\tau_2 < 1\%$
$\tau_3 = 14\%$
$\tau_4 = 20\%$
$\tau_{vis} = 19\%$
$\tau_3 1 \tau_{vis} = 0,74$
$\lambda_H = 475$ nm
$S = 2,8\% \cdot nm^{-1}$ Here it is essential that $\tau_3$ is at least five times, preferably at least 10 times and furtheron preferably at least 50 times of $\tau_2$. Furthermore, the following criteria should be fulfilled:

a) The mean transmittance of the light filter in the 250 to 380 nm spectral range is at most 10%, preferably at most 1% and still more preferably 0.1%;
b) The mean transmittance of the light filter in the 450 to 550 nm range is at least 0.6 times as much, preferably at least 0.7 times as much and still more preferably at least 0.84 times as much of the light transmittance ($\tau_{vis}$);
c) The cut-off location ($\lambda H$) of the filter is at least 450 nm and at most 550 nm; and
d) The steepness (S) of the transmittance curve of the cut-off location ($\lambda H$) of the filter is at least $1\% \cdot nm^{-1}$, preferably at least $2\% \cdot nm^{-1}$ or, more preferably, at least $3\% \cdot nm^{-1}$. This is valid also with regard to the recognizing of traffic signal colors. The neutral filter material transmits within the wave length range of 964 largely independent from the wave length, nearly constant.

EXAMPLE 9

The light filter are sun spectacles the panes of which consisting of polycarbonate. Before injection moulding 5% filter material as masterbatch SEEMORE GREEN PO1 (Mutzhas Produktions-Gesellschaft mbH, Munich) is admixed to the PC-granulate. The following individual values are obtained:
$\tau_1 < 0.1\%$
$\tau_2 < 1\%$
$\tau_3 = 42\%$
$\tau_4 = 60\%$
$\tau_{vis} = 53\%$
$\tau_3 1 \tau_{vis} = 0.79$
$\lambda_H = 475$ nm
$S = 1.8\% \cdot nm^{-1}$ When the light filter described in example 2 was used, the following changes of visual acuity (SNELLEN ACUITY) were detected in tests with elderly test persons being measured in a distance of 20 feet (6.1 m) from the visual object.

| Contrast | without light filter | with light filter |
|---|---|---|
| 3% | 20/180 | 20/99 |
| 10% | 20/65 | 20/49 |

EXAMPLE 10

The light filter is a sheet of polycarbonate with a thickness of 2 mm. Before injection moulding a bit less than 5% of the filter material as masterbatch SEEMORE YELLOW P01 (Mutzhas Produktions-Gesellschaft mbH, Munich) is admixed to the PC-granulate. After the injection moulding the sheet is coated with siloxane lacquer. The following individual values are obtained:
$\tau_1 < 0.1\%$
$\tau_2 < 1\%$
$\tau_3 = 63\%$
$\tau_4 = 91\%$
$\tau_{vis} = 90\%$
$\tau_3 1 \tau_{vis} = 86$
$\lambda_H = 476$ nm
$S = 2.6\% \cdot nm^{-1}$

EXAMPLE 11

If the light filter according to example 10 is made non-reflective at both sides by vapour-deposition, than the following values are achieved:
$\tau_1 < 0.1\%$
$\tau_2 < 1\%$
$\tau_3 = 64\%$
$\tau_4 = 96\%$
$\tau_{vis} = 92\%$
$\tau_3 1 \tau_{vis} = 0.70$
$\lambda_H = 476$ nm
$S = 2.6\% \cdot nm^{-1}$ Accordingly, it has been possible for the first time to produce such spectacles according to DIN 58216 and DIN 58Z17 for the drivers of a vehicle which meet these requirements at the day, at the night and in twilight. Required is $\tau_{vis} > 80\%$ (according to remark in DIN 58216 $\tau_{vis} > 85\%$). The relative weakening quotients for the signal lights red $Q_{RED}$, yellow $Q_{YELLOW}$, green $Q_{GREEN}$ and blue $Q_{BLUE}$ must be $\geq 0.8$. The following values are reached.
$Q_{RED} = 0.95$
$Q_{YELLOW} = 0.97$
$Q_{GREEN} = 0.90$
$Q_{BLUE} = 0.80$

EXAMPLE 12

The light filter is a polycarbonate sheet with a thickness of 2 mm. Before injection moulding closely 2.5% filter material as Masterbatch SEEMORE YELLOW P01 (Mutzhas Produktions-Gesellschaft mbH, Munich) is admixed to the PC-granulate. After the injection moulding the sheet is coated with siloxane lacquer. The following individual values are obtained:

$\tau_1 < 0.1\%$
$\tau_2 < 2\%$
$\tau_3 = 66\%$
$\tau_4 = 90\%$
$\tau_{vis} = 87\%$
$\tau_3 1\tau_{vis} = 0.76$
$\lambda_H = 468$ nm
$S = 2.6\% \cdot \text{nm}^{-1}$
$Q_{RED} = 0.89$
$Q_{YELLOW} = 0.92$
$Q_{GREEN} 0.84$
$Q_{BLUE} = 0.80$

EXAMPLE 13

The light filter is a sheet of polymerized allyl-diethylen glycol carbonate (ADC) with a thickness of 2 mm. Before polymerizing 5% filter material SEEMORE YELLOW P11. (Mutzhas Produktions-Gesellschaft mbH, Munich) is admixed to the monomer. The following individual values are obtained:
$\tau_1 < 0.1\%$
$\tau_2 < 1\%$
$\tau_3 = 64\%$
$\tau_4 = 92\%$
$\tau_{vis} = 87\%$
$\tau_3 1\tau_{vis} = 0.74$
$\lambda_H = 476$ nm
$S = 2.6\% \cdot \text{nm}^{-1}$
$Q_{RED} = 0.90$
$Q_{YELLOW} = 0.92$
$Q_{GREEN} 0.85$
$Q_{BLUE} = 0.80$

EXAMPLE 14

If the light filter according to example 13 is made non-reflective at both sides by vapour-deposition, than the following values are achieved:
$\tau_1 < 0.1\%$
$\tau_2 < 1\%$
$\tau_3 = 64\%$
$\tau_4 = 99\%$
$\tau_{vis} = 93\%$
$\tau_3 1\tau_{vis} = 0.65$
$\lambda_H = 476$ nm
$S = 2.6\% \cdot \text{nm}^{-1}$
$Q_{RED} = 0.96$
$Q_{YELLOW} = 0.98$
$Q_{GREEN} 0.91$
$Q_{BLUE} = 0.81$

SUMMARY OF THE FORMULA SYMBOLS $\tau(\lambda)$: Spectral transmittance degree of the light filter $\tau_1$: Mean transmittance of the light filter from 250 to 380 nm $\tau_2$: Mean transmittance of the light filter from 380 to 450 nm $\tau_3$: Mean transmittance of the light filter from 450 to 550 nm $\tau_4$: Mean transmittance of the light filter from 550 to 780 nm $\tau_{vis}$: Light transmittance of the light filter from 380 to 780 nm relative to light type D 65

$\lambda_H$: Cut-off location (nm) point on the spectral transmittance curve rising to long-wave range at which half of the maximum transmittance in the 380 to 780 nm range is registered (nm)

$S$: Edge steepness ($\% \cdot \text{nm}^{-1}$), steepness of the spectral transmittance curve at point $\lambda_H$ The addmixtures or masterbatches respectively contain the following components the face concentration thereof in the finished light filter being given in parentheses.

Seemore Yellow G01:
Sulfur- (0.01-10 g/m$^2$) and/or Cadmiumsulfide (0.01-10 g/m$^2$) Seemore Yellow P 01 to P11, Seemore Gray P 01 and Seemore Green P01:

As UV-absorbers benzotriazoles (0.1-50 g/m$^2$) and/or benzophenones (0.1-50 g/m$^2$) as well as soluble coloring substances and/or color pigments of the color material groups antrachinon (0.1-5 g/m$^2$), chinakridon (0.1-5 g/m$^2$), diazo (0.1-5 g/m$^2$), monoazo (0.1-5 g/m$^2$), phtalocyanin (0.1-5 g/m$^2$), pyrazolon (0.1-5 g/m$^2$), black (0.1-5 g/m$^2$). the color substances can be used alone or in combination.

An UV-absorber concentration of 2-5 g/m$^2$ and a coloring substance concentration of 0.1-0.3 g/m$^2$ is proved to be particularly advantageous.

We claim:

1. A light filter for filtering light for a human eye, said filter being formed of plastic material combined with a filtering material so as to provide said filter with the following transmittance characteristics:
   a) a cut-off location ($\lambda H$) of 450 nm to 550 nm, wherein the cut-off location is that point on a spectral transmittance curve for the filter at which half of a maximum transmittance in a 380 to 780 nm range is registered,
   b) a steepness (S) for the transmittance curve at the cut-off location of at least 1%nm$^{-1}$,
   c) a means transmittance ($\tau_2$) in a spectral range from 380 to 450 nm of at most 20%, and
   d) a means transmittance ($\tau_3$) in a spectral range from 450 to 550 nm of at least 40%.

2. A light filter according to claim 1 wherein said filtering material includes an organic dye dissolved in the plastic material forming said filter.

3. A light filter according to claim 1 wherein said filtering material includes an organic pigment finely distributed in the plastic material forming said filter.

4. A light filter according to claim 1 wherein the mean transmittance ($\tau_2$) in the 380 to 450 nm spectral range is at most 10% and the mean transmittance ($\tau_3$) in the 450 to 550 nm spectral range is at least 60%.

5. A light filter according to claim 1 wherein the means transmittance ($\tau_2$) in the 380 to 450 nm spectral range is at most 1% and the mean transmittance ($\tau_3$) in the 450 to 550 nm spectral range is at least 70%.

6. A light filter according to claim 1 wherein said filter has a mean transmittance ($\tau_4$) in a 550 to 780 nm spectral range of at least 45%.

7. A light filter according to claim 1 wherein said filter has a mean transmittance ($\tau_4$) in a 550 to 780 nm spectral range of at least 65%.

8. A light filter according to claim 1 wherein said filter has a mean transmittance ($\tau_4$) in a 550 to 780 nm spectral range of at least 85%.

9. A light filter according to claim 1 wherein said filter has a mean transmittance ($\tau_1$) in a 250 to 380 nm spectral range of at most 10%.

10. A light filter according to claim 1 wherein said filter has a mean transmittance ($\tau_1$) in a 250 to 380 nm spectral range of at most 1%.

11. A light filter according to claim 1 wherein said filter has a mean transmittance ($\tau_1$) in a 250 to 380 nm spectral range of at most 0.1%.

12. A light filter according to claim 1 wherein said light filter has a means transmittance ($\tau_3$) in the 450 to 550 nm range of at least 0.6 times as much as a light transmittance value ($\tau_{vis}$) of said filter is a spectral rang of 380 to 780 nm.

13. A light filter according to claim 1 wherein said light filter has a means transmittance ($\tau_3$) in the 450 to 550 nm range of at least 0.7 times as much as a light transmittance value ($\tau_{vis}$) of said filter is a spectral rang of 380 to 780 nm.

14. A light filter according to claim 1 wherein said light filter has a means transmittance ($\tau_3$) in the 450 to 550 nm range of at least 0.8 times as much as a light transmittance value ($\tau_{vis}$) of said filter is a spectral rang of 380 to 780 nm.

15. A light filter according to claim 1 wherein the steepness (S) of the transmittance curve at the cut-off location ($\lambda$H) is at least 2%.nm$^{-1}$.

16. A light filter according to claim 1 wherein the steepness (S) of the transmittance curve at the cut-off location ($\lambda$H) is at least 3%.nm$^{-1}$.

17. A light filter according to claim 1 wherein said plastic material has an impact resistance of at least 15 KJ.m$^{-2}$.

18. A light filter according to claim 1 wherein said plastic material has an impact resistance of at least 40 KJ.m$^{-2}$.

19. A light filter according to claim 1 wherein said plastic material has an impact resistance of at least 65 KH.m$^{-2}$.

20. A light filter according to claim 3 wherein said pigment concentration is 0.1 to 5 g/m$^2$.

* * * * *